(12) United States Patent
Roeth et al.

(10) Patent No.: US 7,048,402 B2
(45) Date of Patent: May 23, 2006

(54) LAMP ASSEMBLY FOR A MICROSCOPE

(75) Inventors: Jasna Roeth, Solms (DE); Manfred Gilbert, Schoeffengrund (DE); Kenneth M. Northem, W. Seneca, NY (US); Paul M. Harrison, Alden, NY (US)

(73) Assignee: Leica Microsystems CMS GmbH, Wetzlar (DE)

( * ) Notice: Subject to any disclaimer, the term of this patent is extended or adjusted under 35 U.S.C. 154(b) by 210 days.

(21) Appl. No.: 10/810,980

(22) Filed: Mar. 26, 2004

(65) Prior Publication Data

US 2005/0213205 A1   Sep. 29, 2005

(51) Int. Cl.
*F21V 33/00*   (2006.01)

(52) U.S. Cl. .................. 362/89; 362/253; 362/659; 359/385; 439/602; 439/699.2

(58) Field of Classification Search .................. 362/89, 362/253, 659; 359/385; 439/602, 699.2
See application file for complete search history.

(56) References Cited

U.S. PATENT DOCUMENTS

| | | | | |
|---|---|---|---|---|
| 3,942,858 A | * | 3/1976 | Ouchi | 439/346 |
| 4,039,817 A | | 8/1977 | Williams | 240/2 |
| 4,379,625 A | * | 4/1983 | Uchiumi et al. | 359/363 |
| 6,304,375 B1 | | 10/2001 | Furuhashi | 359/385 |

* cited by examiner

*Primary Examiner*—Stephen Husar
*Assistant Examiner*—Jason Han
(74) *Attorney, Agent, or Firm*—Simpson & Simpson, PLLC

(57) ABSTRACT

A lamp assembly for a microscope, the microscope having a stand, comprising a female member comprising a first electrical socket, the socket arranged to provide a source of electricity for a lamp, the female receptacle located inside the microscope stand, and, a male member comprising at least two electrical pin terminals arranged to matingly engage the first electrical socket to receive electricity therefrom, and, a second socket electrically connected to the at least two electrical pin terminals, the second socket arranged to hold the lamp and provide electricity thereto.

14 Claims, 10 Drawing Sheets

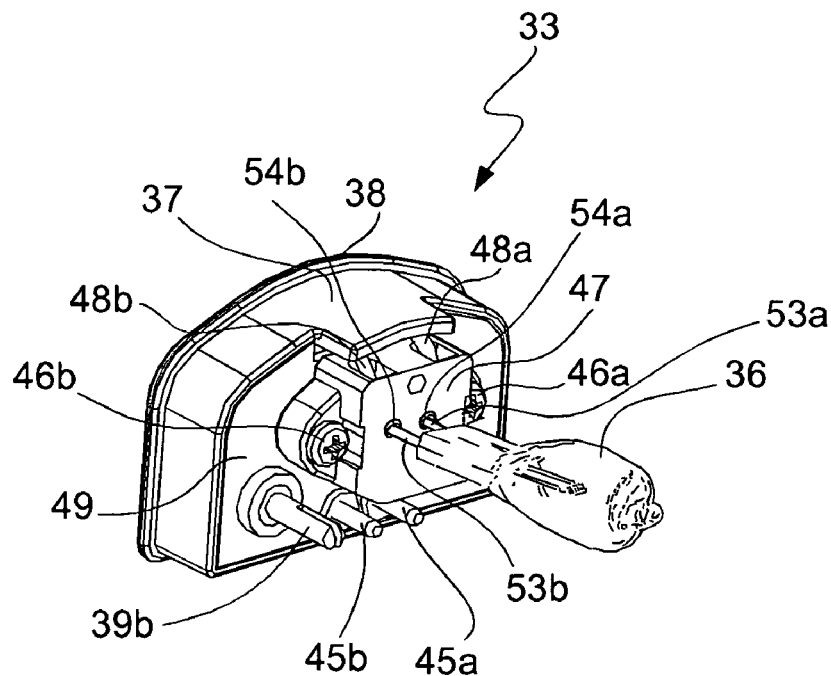
Fig. 6
Fig. 7
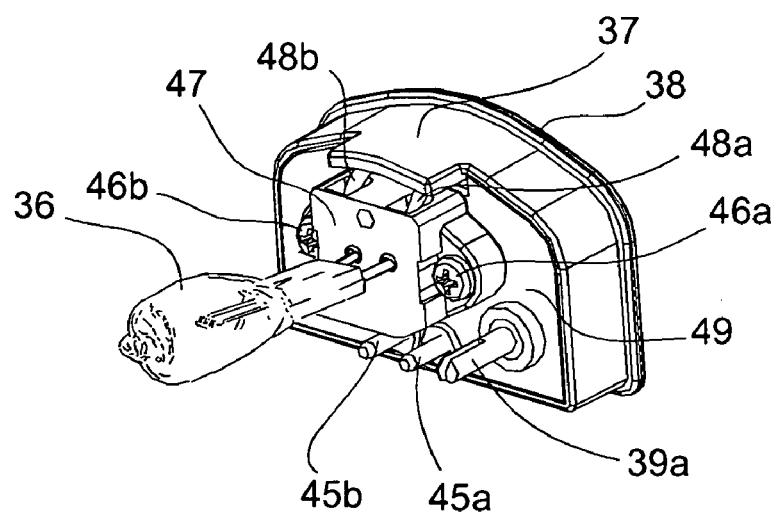

LAMP ASSEMBLY FOR A MICROSCOPE

FIELD OF THE INVENTION

The present invention relates generally to microscopy, more specifically to microscopes, and, even more particularly, to a lamp assembly for a microscope.

BACKGROUND

As is well known, a microscope is an optical instrument used to view, examine and study very small objects. There are many different types of microscopes, each best suited to particular applications. These include compound microscopes, stereomicroscopes, confocal microscopes, inverted microscopes, laser microscopes, fluorescence microscopes and polarizing microscopes, to name but a few.

The present invention relates generally to any type of microscope that uses an internal source of light to illuminate the object being investigated. It is common practice to use an incandescent light source in microscopes. Often, halogen bulbs are used. From time to time the bulbs fail and need to be replaced. In many microscopes, it is either difficult or inconvenient to replace a failed bulb, requiring disassembly of the microscope or microscope stand.

Others have addressed the problem of facilitating bulb replacement in microscopes. U.S. Pat. No. 6,304,375 (Furuhashi) discloses an upright microscope having a removable lid member that facilitates access to a light bulb fixedly secured to the base of the microscope inside the stand. A problem with this design is that it requires removal of a substantial part of the microscope (the condenser) which exposes delicate lenses to unnecessary handling.

U.S. Pat. No. 4,039,817 (Williams) discloses a microscope lamp assembly for an operation microscope. This invention suffers from external electrical connections to the lamp. Also, the "male" member of the assembly is not keyed to the aperture, a feature perhaps not needed because of the external wiring. Finally, there is no tab or handle for one to easily grasp the lamp assembly during insertion and removal.

What is needed, then, is an improved lamp assembly for a microscope.

SUMMARY OF THE INVENTION

The present invention broadly comprises a lamp assembly for a microscope, the microscope having a stand, comprising a female member comprising a first electrical socket, the socket arranged to provide a source of electricity for a lamp, the female receptacle located inside the microscope stand, and, a male member comprising at least two electrical pin terminals arranged to matingly engage the first electrical socket to receive electricity therefrom, and, a second socket electrically connected to the at least two electrical pin terminals, the second socket arranged to hold the lamp and provide electricity thereto. In one embodiment, the lamp is part of the lamp assembly.

A general object of the invention is to provide a lamp assembly for a microscope having a female member located within the stand of the microscope and a male member keyed to an aperture in a sidewall of the stand, where the male member is keyed to the aperture to ensure proper alignment. The arrangement includes an internal electrical connection to the lamp, avoiding external wiring, and affords quick and easy bulb replacement.

This and other objects, features, and advantages of the present invention will become readily apparent to those having ordinary skill in the art upon reading the following detailed description of the invention in view of the several drawings of the invention.

BRIEF DESCRIPTION OF THE SEVERAL VIEWS OF THE DRAWINGS

The nature and mode of operation of the present invention will now be more fully described in the following detailed description of the invention taken with the accompanying drawing figures, in which:

FIG. 6 is a perspective view of the component (inside) side of the male member shown from a leftwardly perspective;

FIG. 7 is a view similar to that of FIG. 6, except from a rightwardly perspective;

DETAILED DESCRIPTION OF THE INVENTION

It should be appreciated at the outset that while the present invention relates to an "Lamp Assembly for a Microscope", the Assignees of the present application for patent have developed certain other improvements to microscopes described in United States patent applications entitled "Interchangeable Microscope Stage Drive Assembly", "Releasable/Interchangeable Fine Focus Knob for a Microscope", "Ergonomically Arranged Object Adjustment Controls", "Shielded-Ergonomic Microscope Stages", "Heat Sink Assembly for a Microscope" and "Means for Transporting a Microscope", which applications are filed concurrently herewith by the Assignees of the present application for patent, which Applications are incorporated herewith by reference in their entireties.

Additionally, it should be appreciated that like drawing numbers on different drawing views identify identical structural elements of the invention. While the present invention is described with respect to what is presently considered to be the preferred embodiments, it is understood that the invention is not limited to the disclosed embodiments. In the description below, the terms "up", "down", "forward", "backward", "left", "right", and their derivatives, should be interpreted from the perspective of one viewing the microscope shown in FIG. 1.

The present invention broadly comprises a lamp assembly for a microscope, the microscope having a stand, comprising a female member comprising a first electrical socket, the socket arranged to provide a source of electricity for a lamp, the female receptacle located inside the microscope stand, and, a male member comprising at least two electrical pin terminals arranged to matingly engage the first electrical socket to receive electricity therefrom, and, a second socket electrically connected to the at least two electrical pin terminals, the second socket arranged to hold the lamp and provide electricity thereto. In a second embodiment, the lamp is part of the lamp assembly.

Figure 1:
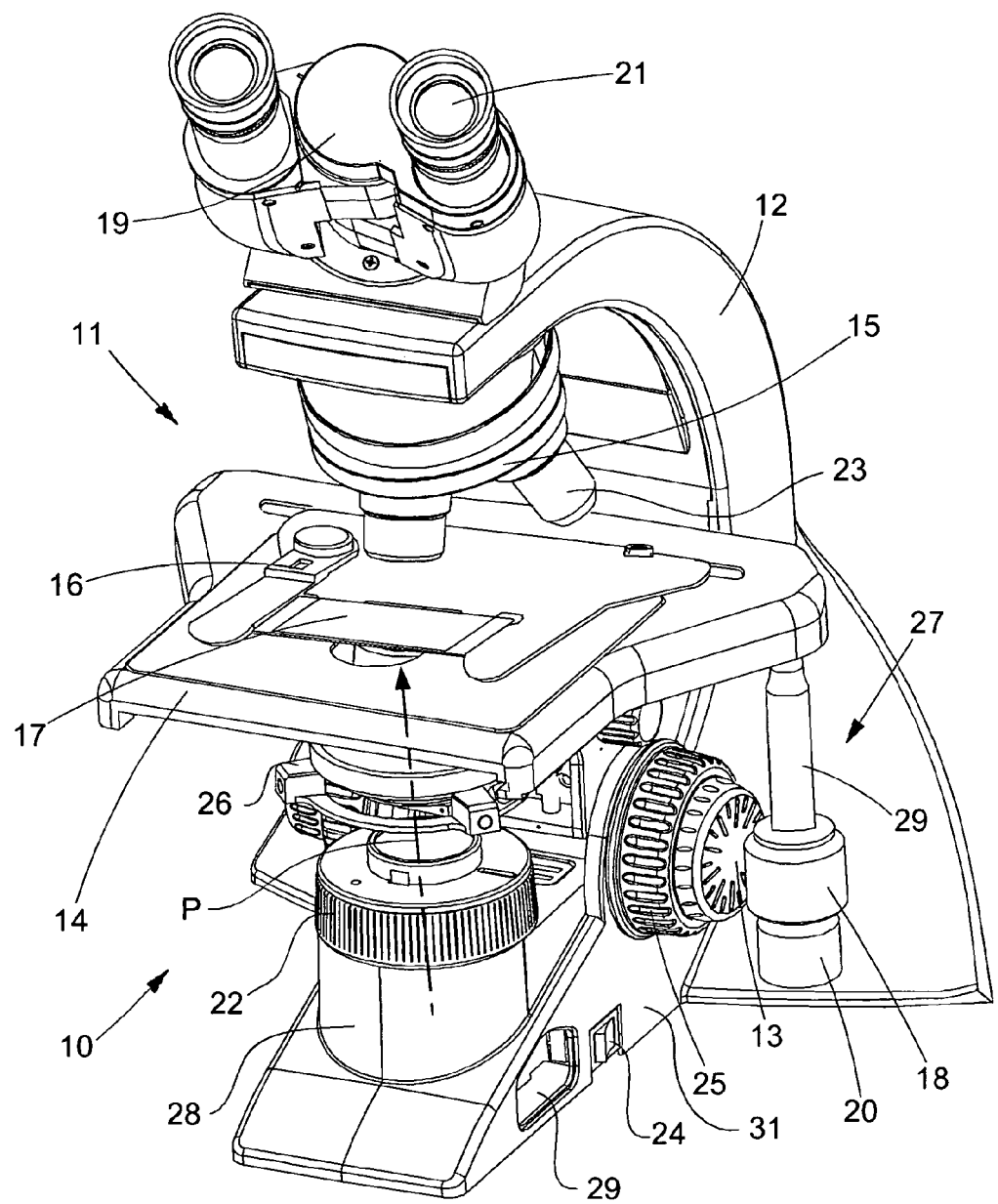
FIG. 1 is a perspective view of a typical compound microscope with which the lamp assembly of the present invention is adaptable for use.

FIG. 1 illustrates the general structure of compound microscope 10. The microscope broadly comprises mounting stand 12 to which all the component pieces of the microscope are mounted. In the embodiment shown, the viewing body 19 is binocular, comprising the body and two eyepieces 21. The viewing body is not particularly germane to the invention, which is suitable for use with a microscope configured with any type of viewing body (monocular, binocular, trinocular, video, etc.). Objective lenses are mounted to rotatable turret 15. Microscope 10 further comprises interchangeable microscope stage drive system 11, which is mounted to stand 12. Interchangeable microscope stage drive system 11 comprises slide mount 16, stage 14, and drive mechanism 27. Slide mount 16 is incorporated into stage system 11 and enables movement of slide 17 holding the specimen to be viewed. Coarse focus knob 25 and fine focus knob 13 are mounted to stand 12 and arranged for rotation. Rotating knobs 13 and 25 move stage 14 up and down, further moving slide 17 within the optical path of the microscope, allowing for focus at the specimen. Field diaphragm assembly 22 is mounted on illuminator base 23, integral with stand 12. The field diaphragm assembly provides a controllable source of light to illuminate the specimen as is well known in the art. In the several drawing views of the invention, a Koehler type illuminator is shown, although the invention is suitable for use with other illuminator configurations as well. The illuminator is activated by power switch 24. Light from the illuminator travels in an illumination beam path P upwardly through condenser assembly 26, which functions to further aperture and gather and focus the light. In addition to a light source described in more detail infra, the Koehler type illuminator also includes field diaphragm assembly 22, an iris diaphragm constructed of a number of interconnected leaves that, when adjusted, open and close the iris to control the light. Many of these elements, aside from the light source described infra, are described for general illustration purposes only, and are not particularly germane to the present invention.

Figure 2:
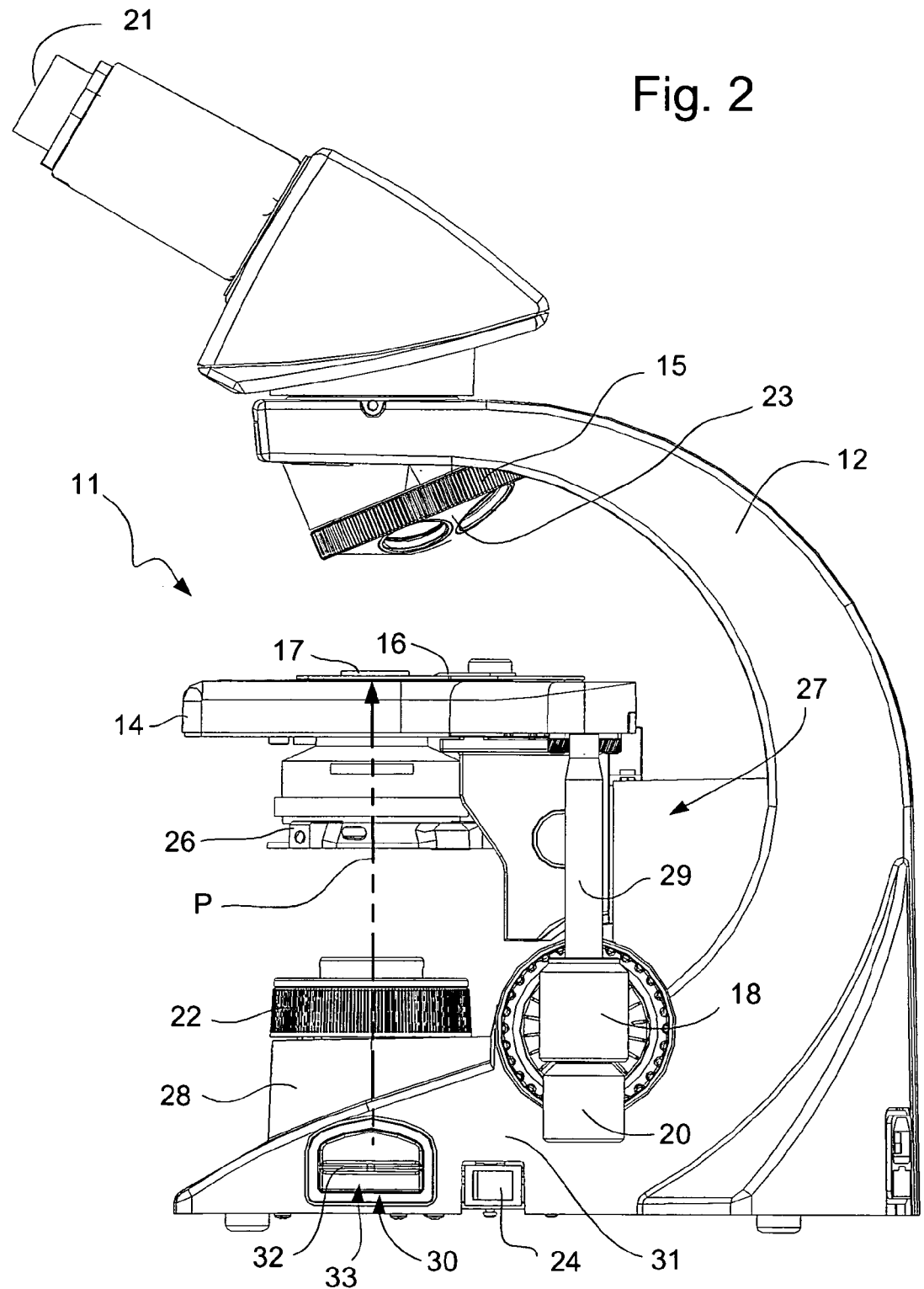
FIG. 2 is a right side view of the microscope shown in FIG. 1.

The microscope of FIG. 1 is shown in side view in FIG. 2. Lamp assembly 30 of the present invention is shown generally in this view. Male lamp assembly member 33 is shown generally inserted in aperture 29 (shown in FIG. 1) in side wall 31 of stand 12. Tab 32 on male member 33 is arranged for grasping the male member for insertion and removal of the lamp assembly from the microscope stand. This view also shows how beam path P travels upwardly from lamp 36 (shown in FIG. 5).

Figure 3:
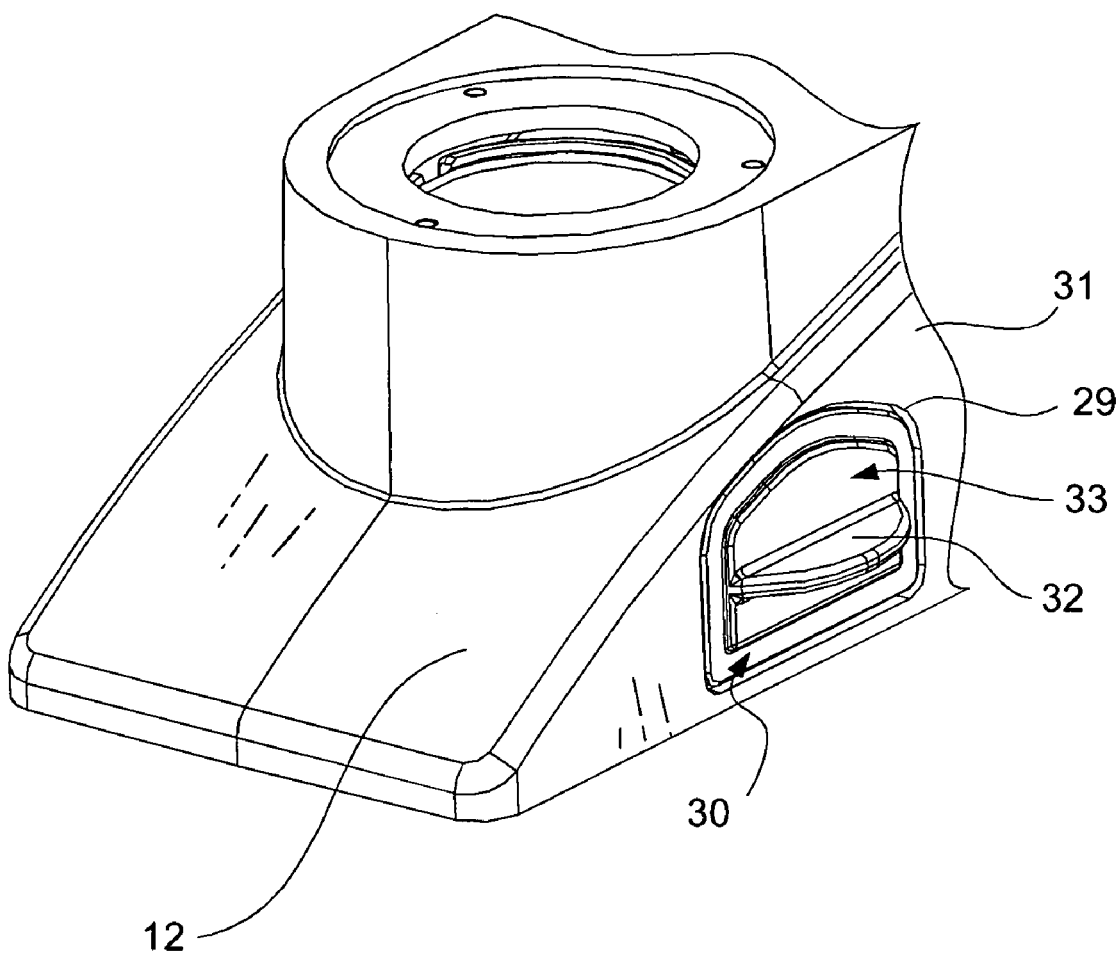
FIG. 3 is a fragmentary perspective view of the front section of microscope stand 12, intended to show how the lamp assembly of the invention is inserted into the stand.

FIG. 3 is an enlarged perspective fragmentary view of stand 12 illustrating male member 33 installed in aperture 29 of stand 12. When inserted, male member 33 is substantially flush with wall 31 of stand 12, except for tab 32 which extends outwardly from member 33.

Figure 4:
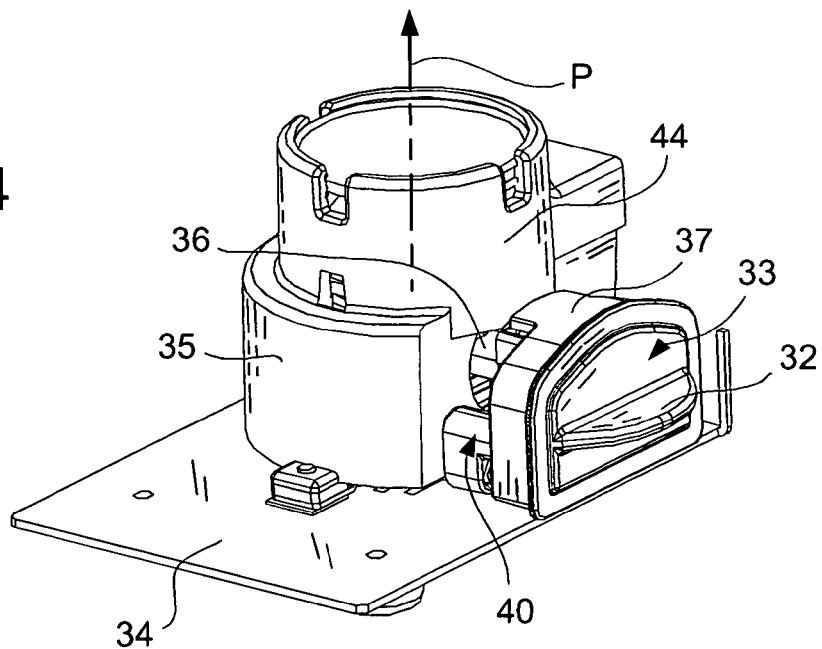
FIG. 4 is a view similar to that of FIG. 3, except with the top of the stand and ancillary parts removed to better illustrate the lamp assembly of the invention, shown with the male member of the lamp assembly inserted into the female member.
Figure 5:
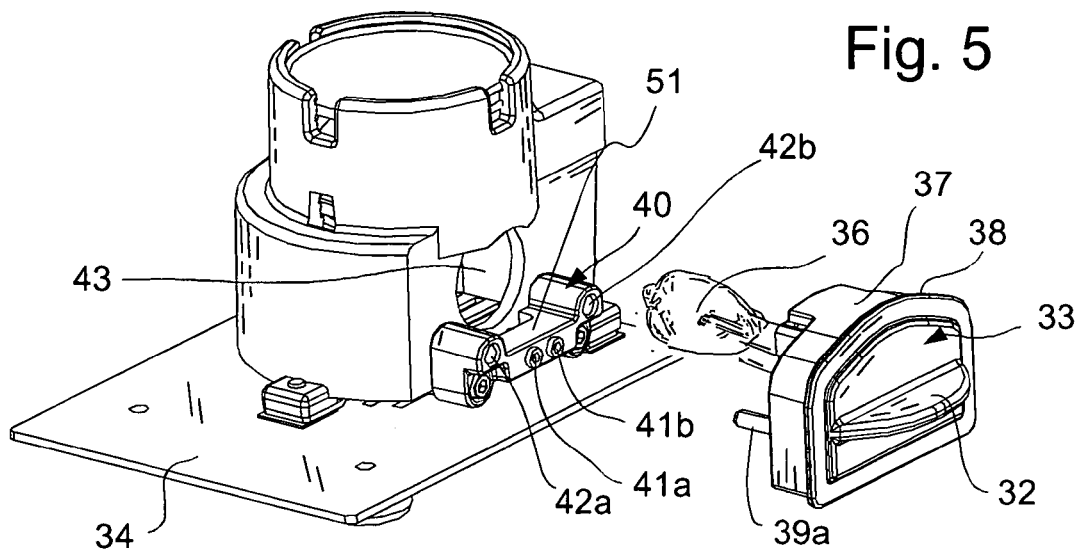
FIG. 5 is a view similar to that of FIG. 4, except with the male member removed from the female member.

FIG. 4 is a view similar to that of FIG. 3, except with the top and sides of the stand cut away to reveal base plate 34 of microscope 10. Mounted to base plate 34 is heat sink 35, atop which is mounted collector lens 44. The heat sink includes aperture 43, shown in FIG. 5, into which the lamp is inserted. FIG. 4 is a view showing male member 33 of the lamp assembly inserted into female member 40. FIG. 5 is a view similar to that of FIG. 4 except with the male member removed. This view clearly shows how lamp 36 is aligned to be inserted into aperture 43. In a first embodiment, the light bulb 36 is not part of the lamp assembly per se—the lamp assembly accommodates installation of the light bulb. In a second embodiment, the lamp assembly includes the lamp. In the embodiment shown, a 30 watt halogen incandescent bulb is shown, although other light sources could be held in place by the light assembly. FIGS. 4 and 5 illustrate how handle tab 32 can be used to insert and remove the male member of the light assembly.

Male member 33 of lamp assembly 30 is illustrated in perspective view in FIGS. 6 and 7. These views show socket 47 (referred to in claim 1 as "second socket") operatively arranged to hold light bulb 36 and provide electricity thereto. Electricity is provided to the socket via two electrical pin terminals 45a and 45b which, in turn, receive electricity from first socket 51 of female member 40 (shown in FIG. 5 and other drawings.) The electricity is conducted from terminals 45a and 45b to socket terminals 46a and 46b, respectively, via cables 48a and 48b, respectively, for connection to terminals 53a and 53b of light bulb 36, shown in more detail in FIG. 10. Thus, it is seen that the male member includes a "closed loop" which brings electricity into the member via protruding electrical pins, and conducts the electricity back to the light socket via two cables. This simple but ingenious circuitry and construction obviates the need for external power cables for the lamp.

Figure 8:
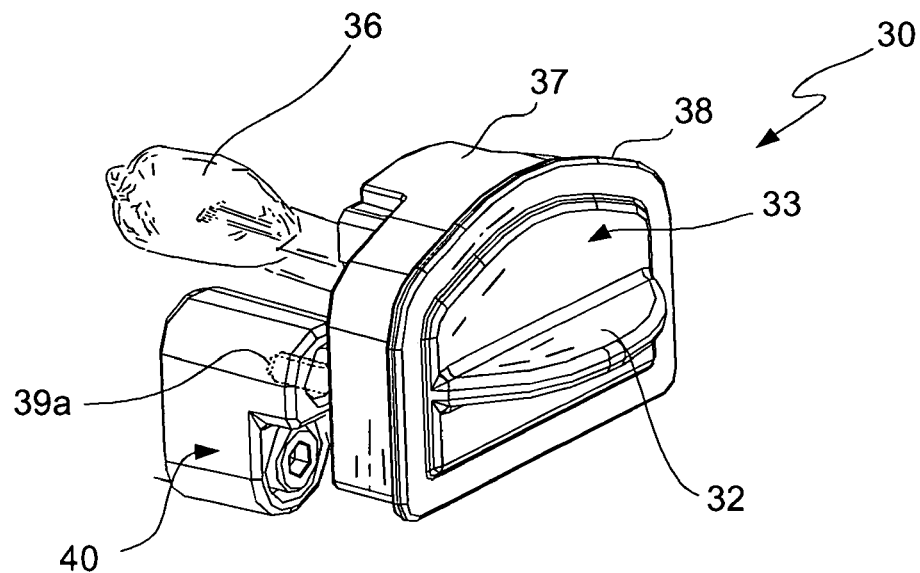
FIG. 8 is a perspective view of the lamp assembly of the invention, shown with the male member inserted into the female member.
Figure 9:
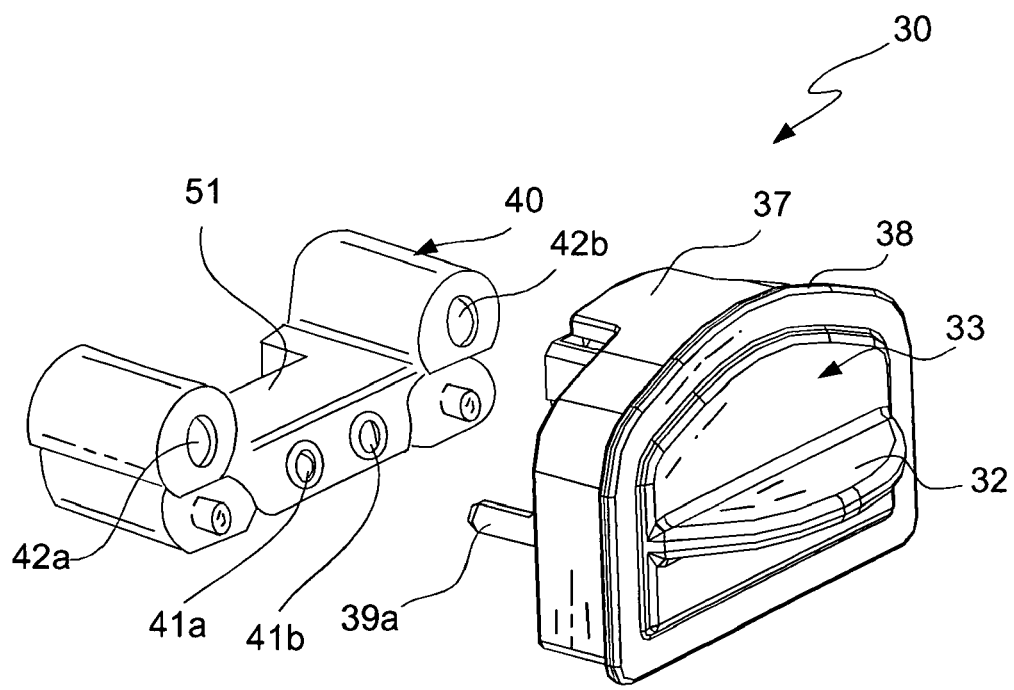
FIG. 9 is a view similar to that of FIG. 8, but with the male member separated from the female member.

FIG. 8 is a perspective view that illustrates male member 33 coupled to female member 40. In this view, the light bulb is in place in the socket of the male member. Tab 32 on male member 33 is arranged to be grasped by a user of the microscope to easily insert and remove the male member therefrom to service the bulb. FIG. 9 is a view similar to FIG. 8 but with the male member separated from the female member.

Figure 10:
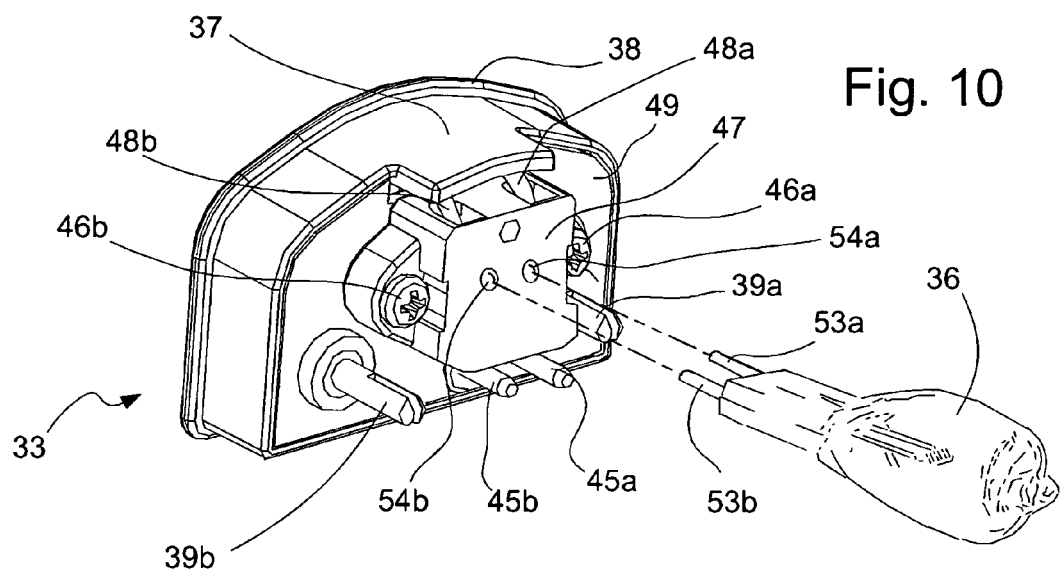
FIG. 10 is a partially exploded perspective view of the male member of the lamp assembly and a light bulb arranged to be inserted thereto.

As previously described, FIG. 10 is a partially exploded view that illustrates how bulb 36 is inserted into male member socket 47 (which socket comprises electrical socket terminals 54a and 54b).

Figure 11:
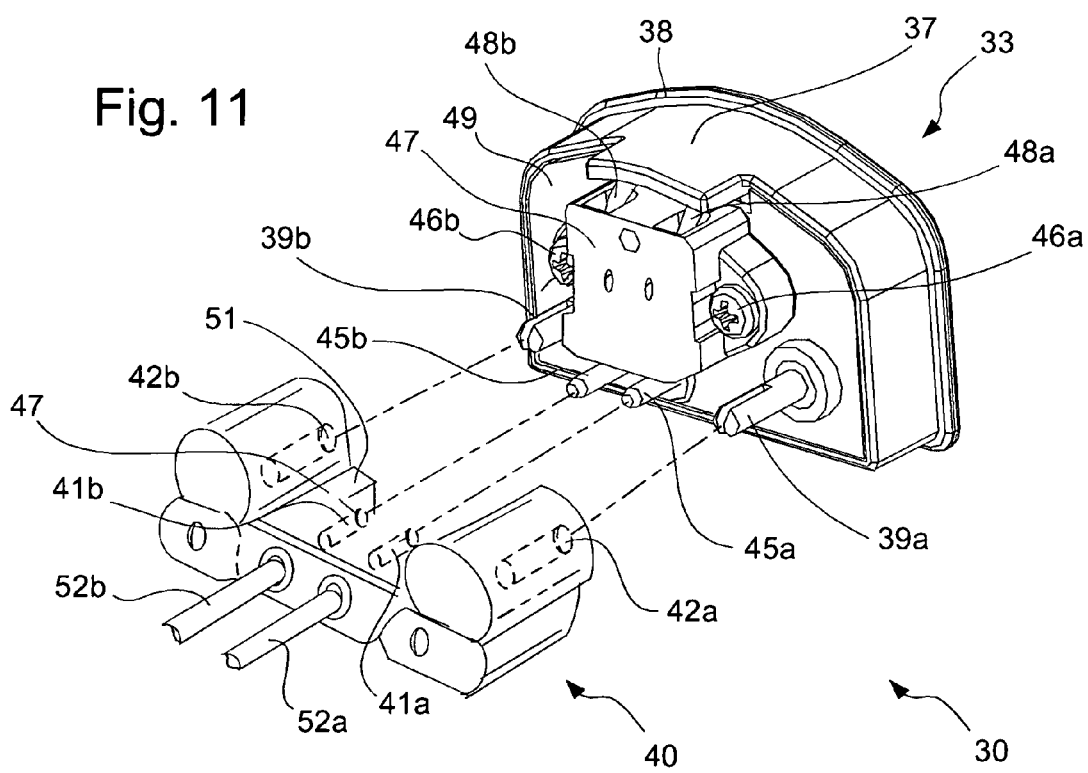
FIG. 11 is a partially exploded perspective view of the male and female members of the lamp assembly, illustrating alignment between the two members.

Obviously alignment of the male member with the female member, and with the microscope stand aperture, is of critical importance to the invention. There are three primary alignment means present in the invention. First, male member 33 is shaped to uniquely enter aperture 29 in only one orientation. Just as one can't insert a square peg into a round hole, one can only insert male member 33 into aperture 29 in only one way. As seen in the various views of the drawing, male member 33 comprises a base and two sides perpendicular to the base, and an arcuate top surface 37. The male member is keyed to the stand aperture. By that we mean that the general shape of the aperture matches that of the male member. A second alignment means is also shown in the drawing figures, and especially in FIGS. 10 and 11. The second alignment means comprises dowels 39a and 39b, operatively arranged to matingly engage dowel receptacles 42a and 42b, respectively. The third alignment means comprises terminals 45a and 45b, which matingly engage female socket 47 receptacles 41a and 42a, respectively. The dowels are shown in FIGS. 10 and 11 as being tension dowels having frictional interference fit within their respective receptacles, ensuring a secure locking relationship. Electrical energy is supplied to the female socket terminals 41a and 41b, respectively, via cables 52a and 52b. These cables, in a typical microscope, provide filtered dc current at relatively low voltage.

FIGS. 10 and 11 illustrate in exploded view the alignment of the male and female members of the lamp assembly. FIG. 10 illustrates how lamp 36 aligns for insertion with male member 33, and FIG. 11 illustrates how male member 33 aligns for insertion into female member 47. It should be appreciated that, although in the embodiment shown, two alignment dowels are used, that it is possible to construct the lamp assembly with a different number of dowels, and, in fact, with an entirely different alignment means in structure. Although the present invention comprises a male member keyed to the microscope stand aperture so that it can be inserted in only one orientation, we specifically suggest to those having ordinary skill in the art that it would be obvious as to how one could make a lamp assembly that is not keyed, and could be inserted in a number of different orientations. For example, the alignment dowels and electrical pints could be arranged co-linearly on either side of the light bulb, such that the male member could be inserted "downside up" or "upside down". We haven't chosen this structure and orientation for our invention but we specifically suggest that this could be done.

Figure 12:
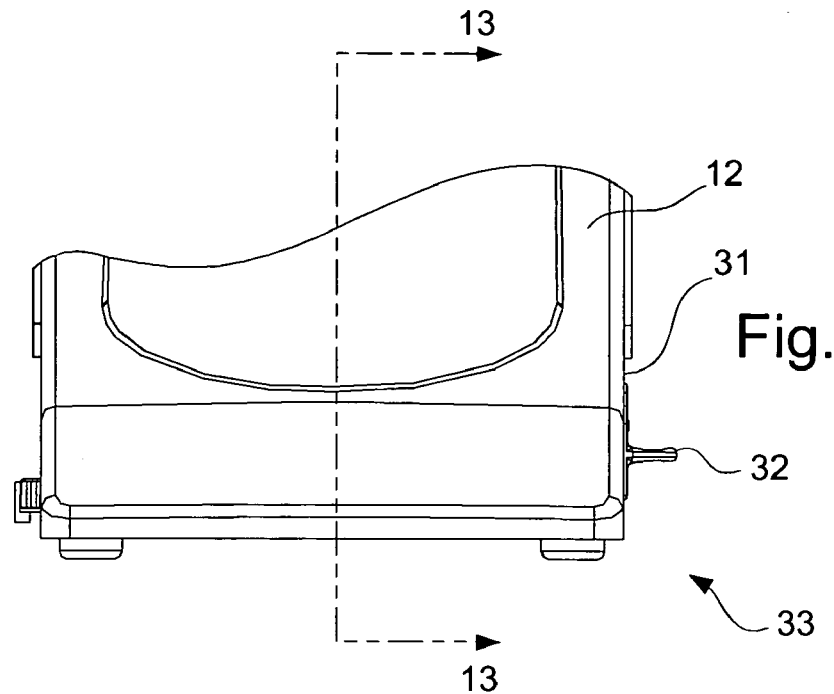
FIG. 12 is a fragmentary front view of the microscope shown in FIG. 1.
Figure 13:
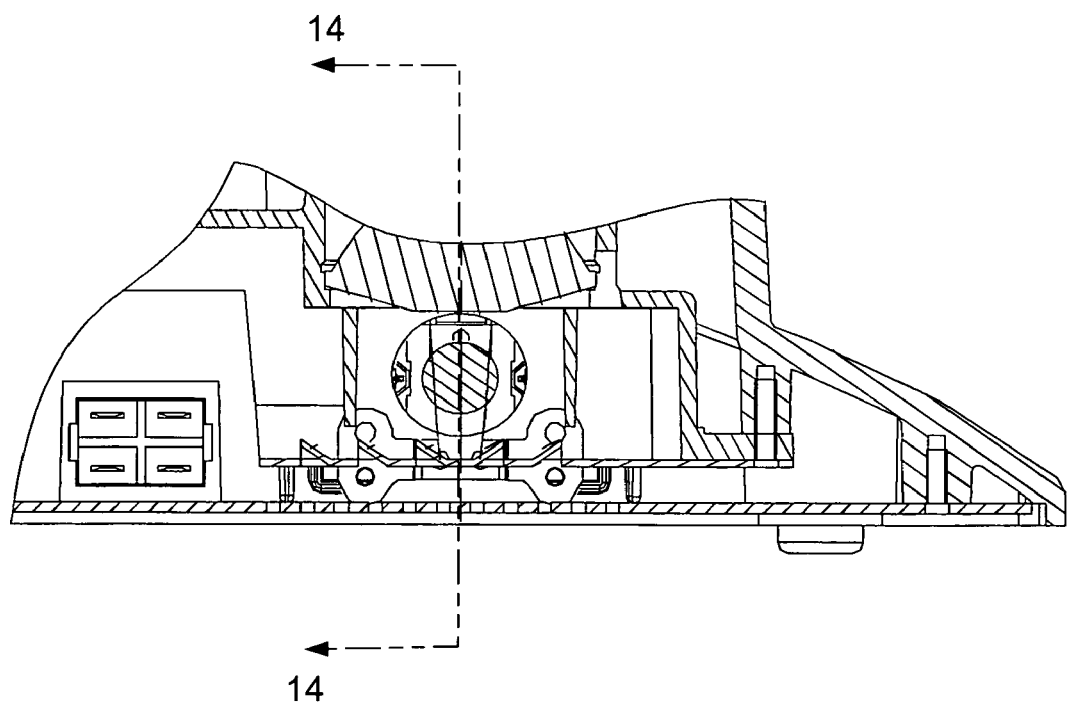
FIG. 13 is a fragmentary cross-sectional view taken generally along line 13—13 in FIG. 12.
Figure 14:
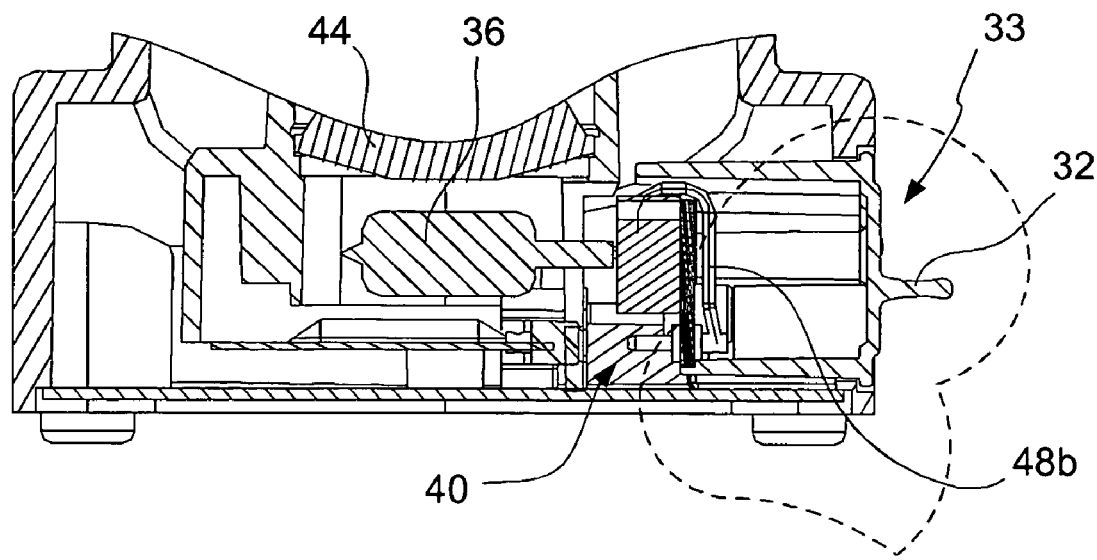
FIG. 14 is a fragmentary cross-sectional view taken generally along line 14—14 of FIG. 13.
Figure 15:
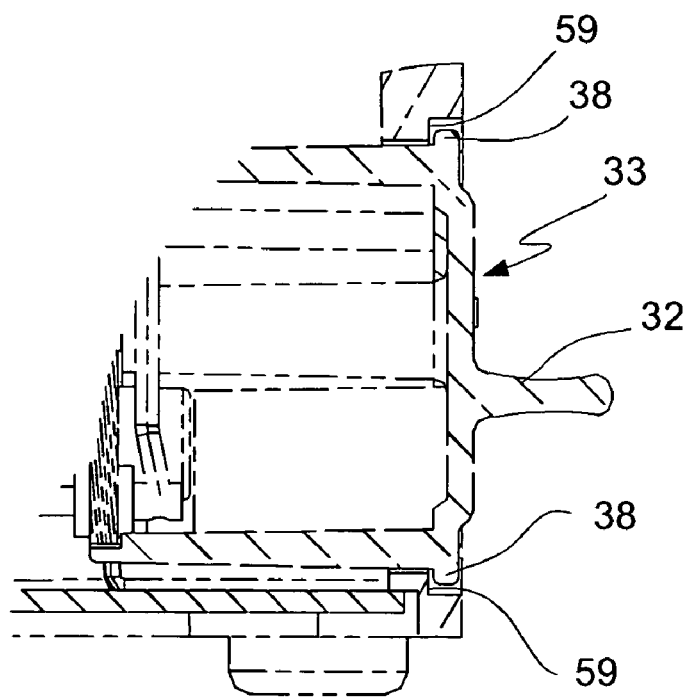
FIG. 15 is an enlarged view of the section of the microscope outlined in dotted line in FIG. 14; and, FIG. 16 is an exploded perspective view of the lamp assembly of the invention.

FIG. 12 is a fragmentary front view of the microscope shown in FIG. 1, intended to illustrate how male member 33 is substantially flush-mounted with respect to side wall 31 of stand 12. FIG. 14 is a fragmentary cross-sectional view taken generally along line 14—4 in FIG. 12, and FIG. 14 is a fragmentary cross-sectional view taken generally along line 14—14 in FIG. 13. FIG. 14 illustrates in cross-section how the male member engages the female member and positions the light bulb precisely beneath the collector lens. The mating engagement of the male member with the stand is further illustrated in FIG. 15, which is an enlargement of the invention shown in dotted line in FIG. 14. This view shows how flange 38 of male member 33 abuts shoulder 59 of the stand housing.

Figure 16:
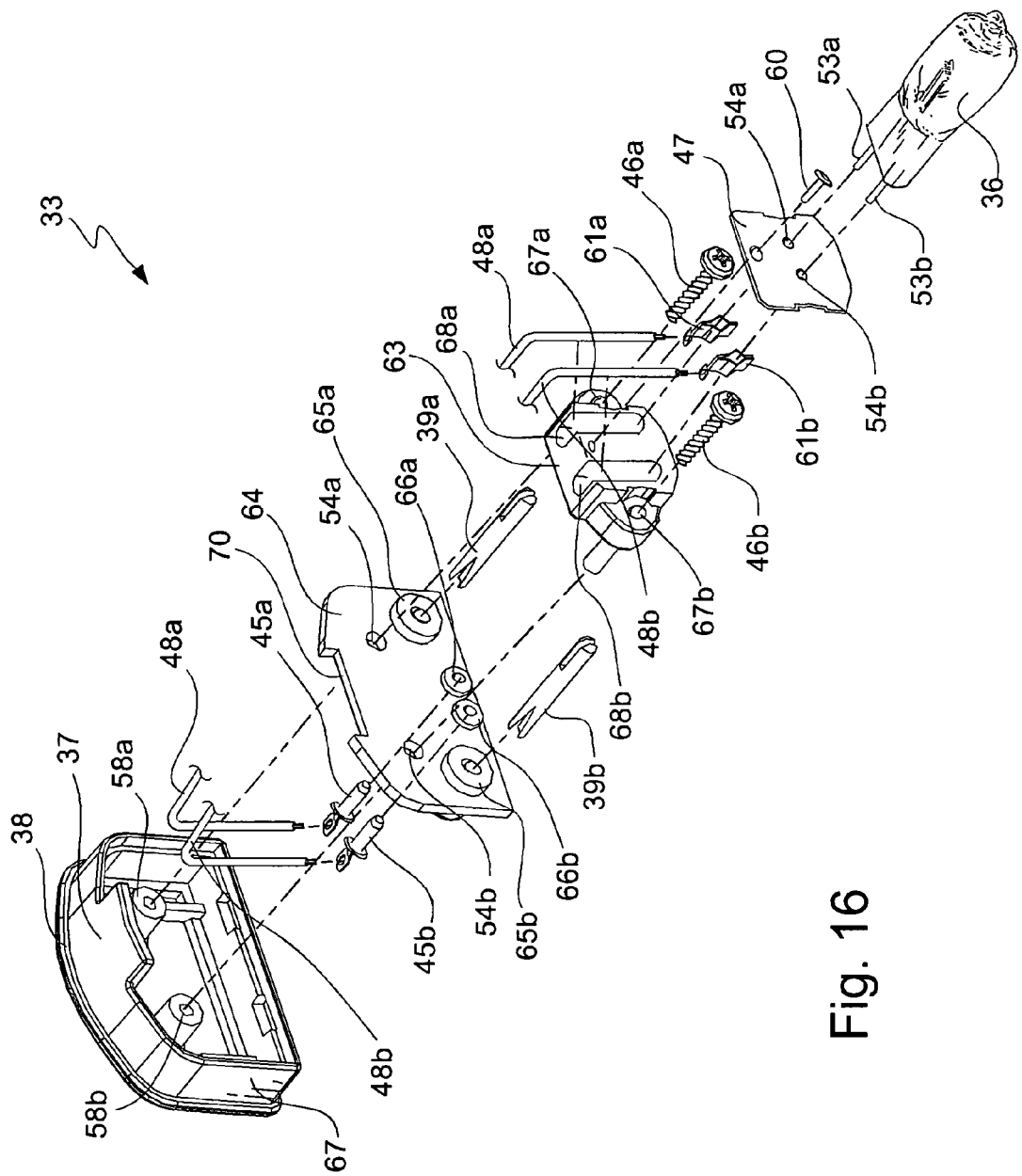

Finally, FIG. 16 is an exploded perspective view of male member 33 of the invention. Male member 33 is shown to comprise main housing 67 which includes partial threaded through-bores 58a and 58b, respectively. Intermediate plate 64 includes partial through-bores 65a and 65b, respectively, arranged to receive and fixedly hold alignment dowels 39a and 39b, respectively. Plate 64 also includes apertures 54a and 54b arranged to receive mounting screws 46a and 46b, respectively. Plate 64 also includes apertures 66a and 66b, arranged to hold terminals 45a and 45b, respectively. First ends of lead wires 48a and 48b are connected to terminals 45a and 45b, respectively. Intermediate plate 63 includes apertures 67a and 67b which permit passage of mounting screws 46a and 46b, respectively. Plate 63 also includes grooves 68a and 68b, respectively, arranged to hold light bulb socket terminals 61a and 61b, respectively. Second ends of lead wires 48a and 48b are connected to light bulb socket terminals 61a and 61b, respectively. The leads pass through notch 70 of plate 64. Mounting screws 46a and 46b hold plates 63 and 64 to main housing 67, and rivet 62 holds front plate 62 to plate 63. Plate 62 includes a pair of apertures 54a and 54b, through which terminal pins 53a and 53b of light bulb 36 are arranged to pass to engage sockets 61a and 61b, respectively. Thus, it is seen that the unique structure of male member 33 permits a unique "closed loop" circuit path to provide electrical energy to light bulb 36 with no need for wiring external to the microscope stand. Electrical energy enters the male member via terminals 45a and 45b in a first direction, and the wiring configuration causes electrical energy to enter the light bulb terminals 53a and 53b which are structurally arranged in a diametrically opposite direction with respect to terminals 45a and 45b.

Thus it is seen that the objects of the invention are efficiently obtained, although changes and modifications to the invention should be readily apparent to those having ordinary skill in the art, which changes are considered to be within the scope of the invention as claimed. For example, although the invention is shown in combination with a compound microscope, it should be appreciated that the invention is suitable for use with a variety of microscope types and with other optical instruments and devices.

What we claim is:

1. A microscope stand comprising a stand having a side wall, said side wall having an aperture keyed to a lamp assembly, said microscope stand further comprising alignment and electrical connection means operatively arranged to engage said lamp assembly, said electrical connection means located entirely within said stand and wherein said alignment means comprises at least one alignment dowel.

2. A lamp assembly for a microscope, comprising:
   a microscope stand receiving a male member comprising:
      at least two electrical pin terminals;
      at least one alignment dowel; and,
      a socket electrically connected to said at least two electrical pin terminals, and a second socket arranged to hold said lamp and provide electricity thereto.

3. The lamp assembly recited in claim 2 wherein said male member is keyed to an aperture formed in said microscope.

4. The lamp assembly recited in claim 2 wherein said male member further comprises a pair of alignment dowels.

5. The lamp assembly recited in claim 2 wherein said male member further comprises a tab extending outwardly from said male member to facilitate grasping during insertion and removal of the male member.

6. A lamp assembly for a microscope, said microscope having a stand, comprising:
   a female member comprising a first electrical socket, said socket arranged to provide a source of electricity for a lamp, said female member located inside said microscope stand; and,
   a male member comprising:
      at least two electrical pin terminals arranged to matingly engage said first electrical socket to receive electricity therefrom; and,
      a second socket electrically connected to said at least two electrical pin terminals, said second socket arranged to hold said lamp and provide electricity thereto wherein said female member comprises at least one dowel receptacle and said male member comprises at least one alignment dowel operatively arranged to align with and matingly engage said dowel receptacle.

7. The lamp assembly recited in claim 6 wherein said microscope stand includes an aperture formed in an external wall thereof, and said male member is keyed to said aperture such that said male member may be inserted into said aperture in only one orientation.

8. The lamp assembly recited in claim 6 wherein said male member further comprises a tab to facilitate grasping during insertion and removal of said male member relative to said aperture.

9. The lamp assembly recited in claim 6 wherein said lamp is a low voltage lamp and all low voltage electricity supplied to said lamp is supplied within said stand.

10. The lamp assembly recited in claim 6 wherein said male member is operatively arranged to substantially flush-engage said microscope stand.

11. The lamp assembly recited in claim 7 wherein said aperture is located in a side wall of said stand.

12. The lamp assembly recited in claim 7 wherein said male member comprises a flange which circumscribes said male member and engages said external wall proximate said aperture.

13. The lamp assembly recited in claim 6 wherein said female member comprises a pair of dowel receptacles and said male member comprises a corresponding pair of alignment dowels operatively arranged to align with and matingly engage said pair of dowel receptacles.

14. The lamp assembly recited in claim 6 wherein said lamp assembly further includes a light bulb arranged in an illumination beam path of said microscope when said male member is inserted into said female member.

* * * * *